United States Patent
Araki

(10) Patent No.: US 6,421,228 B2
(45) Date of Patent: Jul. 16, 2002

(54) MANUFACTURING METHOD OF SOLID ELECTROLYTIC CAPACITOR

(75) Inventor: Kenji Araki, Toyama (JP)

(73) Assignee: NEC Tokin Toyama, Ltd. (JP)

( * ) Notice: Subject to any disclaimer, the term of this patent is extended or adjusted under 35 U.S.C. 154(b) by 0 days.

(21) Appl. No.: 09/849,197

(22) Filed: May 4, 2001

(51) Int. Cl.[7] .................................................. H02G 9/00
(52) U.S. Cl. ........................................ 361/523; 75/229
(58) Field of Search .......................... 561/523; 438/14, 438/472; 75/229; 29/25.03

(56) References Cited

U.S. PATENT DOCUMENTS 6,051,044 A * 4/2000 FIfe .............................. 75/229
6,208,503 B1 * 3/2001 Shimada ..................... 361/523

FOREIGN PATENT DOCUMENTS

| JP | 11-74157 | 3/1999 | .......... H01G/9/028 |
| JP | 11-219862 | 8/1999 | .......... H01G/9/028 |
| JP | 2000-21686 | 1/2000 | .......... H01G/9/028 |

* cited by examiner

Primary Examiner—John F. Niebling
Assistant Examiner—Andre C. Stevenson
(74) Attorney, Agent, or Firm—Hayes Soloway P.C.

(57) ABSTRACT

A dielectric film formed on a porous valve metal body is contacted with an oxidizing agent and dried. Then, by contacting the dielectric film with a monomer solution for forming an electrolyte layer of electroconductive polymer, a electrolyte layer of a solid electrolytic capacitor is formed by an oxidative polymerization reaction. An oxidative polymerization retarding agent, which delays the oxidative polymerization reaction, is added to at least one of the solutions, an oxidant solution and a monomer solution. The oxidative polymerization retarding agent delays the oxidative polymerization reaction when it contacts with the oxidant and monomer. As a result, the permeation of the monomer for forming an electroconductive polymer layer into small pores increases, and the covering rate of the electroconductive polymer in small pores increases, which improves the capacitance appearance factor and the equivalent series resistance in high frequency region.

14 Claims, 3 Drawing Sheets

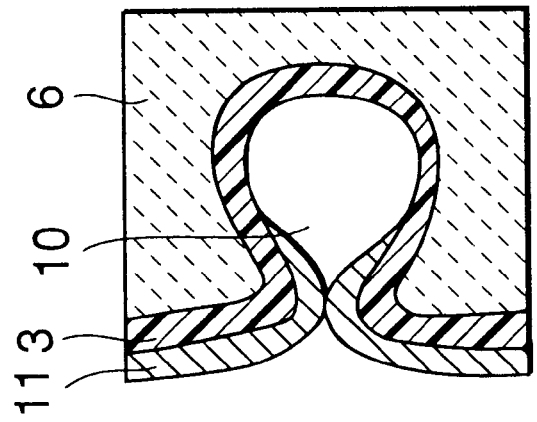
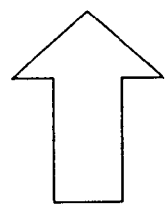
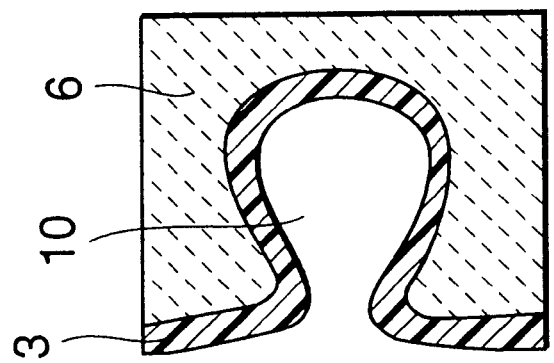
FIG.1A (PRIOR ART)   FIG.1B (PRIOR ART)

MANUFACTURING METHOD OF SOLID ELECTROLYTIC CAPACITOR

BACKGROUND OF THE INVENTION

1. Field of the Invention

The present invention relates to a manufacturing method of a solid electrolytic capacitor, and more particularly to a manufacturing method of a solid electrolytic capacitor using an electroconductive polymer as a solid electrolyte layer.

2. Description of the Related Art

In recent years, due to the miniaturization, high-speed operation, and digitalization of electronic devices, there has been a strong demand for capacitors which are small in size, have a high capacitance, and have a low impedance in high-frequency region in a field of a solid electrolyte capacitor.

Usually, a solid electrolytic capacitor has a solid electrolyte layer such as manganese dioxide or lead dioxide on a dielectric film which is formed by oxidizing the surface of a porous anode body. The porous anode body is made by sintering a molded body of valve metal powder, such as tantalum or aluminum. However, there has been a problem in using this solid electrolyte layer for capacitors in high frequency region because it has a high resistance itself and also has a high equivalent series resistance and high impedance in high-frequency region.

To improve the characteristics for the conventional solid electrolytic capacitor in high frequency region, is known a capacitor with a solid electrolyte layer of an electroconductive polymer such as a five-membered heterocyclic compound (e.g., polypyrrole and polythiophene) and polyaniline, which has a higher conductivity compared with that for the conventional solid electrolyte layer. This electroconductive polymer as a solid electrolyte layer is formed by chemical or electrochemical oxidative polymerization on the dielectric film such as $Ta_2O_5$ made by anodizing electrochemically on the surface of the porous anode body.

However, it is difficult to form an electroconductive polymer layer on the entire surface of the pores of a porous body element covered with a dielectric film. Because of this, the capacitance appearance factor decreases and the equivalent series resistance increases in a high-frequency region for the solid electrolytic capacitor with an electroconductive polymer electrolyte.

FIGS. 1A and 1B are sectional views of a small pore of the porous body element of a solid electrolytic capacitor to explain the formation of the electroconductive polymer layer in its pore by chemical oxidative polymerization after the formation of the dielectric in a conventional manufacturing method of a solid electrolytic capacitor with the electroconductive polymer electrolyte.

In the conventional method, as shown in FIG. 1A, a porous body element 6 with a dielectric film 3 formed on the surface is soaked in an oxidant solution (not shown in FIG. 1A) to make the inside and the outside of a pore 10 of the porous body element 6 adsorb the oxidant. Then, the porous body element is soaked in a monomer solution. When the porous body element is soaked in the monomer solution, chemical oxidative polymerization starts and an electroconductive polymer layer 11, an electrolyte material, is formed before the monomer permeates enough into the pore 10 of the porous body element 6. As a result, as shown in FIG. 1B, the entrance of the pore 10 of the porous body element 6 is clogged with the electroconductive polymer layer 11, preventing the oxidant and the monomer from permeating into the pore 10 of the porous body element 6 in the following chemical oxidative polymerization process.

A technique, which promotes a chemical oxidative polymerization reaction of the monomer for forming the electroconductive polymer layer at the pore and improves the capacitance appearance factor of the capacitor, is disclosed in Japanese Patent Applications Laid-Open No. 11-74157, No. 11-219862, and No. 2000-21686.

In the technique disclosed in Japanese Patent Application Laid-Open No. 11-74157, an electroconductive polymer layer is formed by a chemical oxidative polymerization as follows. A porous body of an electrochemical valve metal with a dielectric film formed on the surface is soaked in a solution (hereinafter referred to as a "reaction solution") which contains a monomer, an oxidizing agent, and a dopant. After the porous body is soaked for a predetermined time, an electroconductive polymer layer is formed on the surface of the dielectric film in the reaction solution. Or, a porous body of an electrochemical valve metal with a dielectric film formed on the surface is soaked in the reaction solution and pulled out of the reaction solution after some of the reaction solution is adsorbed on the surface of the dielectric film. Then, chemical oxidative polymerization takes place in the presence of air and an electroconductive polymer layer is formed on the surface of the dielectric film. While the electroconductive polymer layer is formed on the surface of the dielectric film, the temperature of the porous body itself or of the spaces inside the pores is kept higher than that of the solution. In this technique, by keeping the porous body or inside temperature higher than the solution temperature, the chemical oxidative polymerization reaction rate inside the porous body becomes faster than outside and the production of the electroconductive polymer layer inside a small pore of the porous body is enhanced.

However, in this technique, there is a problem that the production of the electroconductive polymer layer is not uniform inside the small pores because it is difficult to control the temperature inside the pores of the porous body stabilizing.

In the technique disclosed in Japanese Patent Application Laid-Open No. 11-219862, by oxidizing a sintered electrochemical valve metal, a porous body with an oxide film (a dielectric film) on the surface is formed. The porous body is soaked in a monomer solution and then in an oxidant solution to form an electroconductive polymer layer on the oxide film. To improve the yield of the electroconductive polymer layer inside the pores of the porous body, the soaking time of the porous body in the oxidant solution after soaking in the monomer solution is kept less than the time for 30% of the monomer in the porous body to flow out by diffusion. And also the reaction temperature is decreased. As a result, the monomer outflow from the pores is decreased and the yield of the electroconductive polymer layer inside the pores of the porous body is increased.

In this technique, there is a problem that the yield of the electroconductive polymer layer is not uniform inside the pores of the porous body and the capacitance of the capacitor becomes unstable because it is difficult to control the flow of the monomer out of the porous body to a certain constant amount.

In the technique disclosed in Japanese Patent Application Laid-Open No. 2000-21686, the outside of the porous body (dielectric film) is covered with the first electroconductive polymer layer and then the second electroconductive polymer layer is formed inside the dielectric film. The first electroconductive polymer layer is formed in a solution with a higher concentration of the oxidizing agent than the second electroconductive polymer layer so that a high polymerization rate is achieved and the electroconductive polymer layer can be formed preferentially on the surface except small pores, the outer surface of the dielectric film.

In this technique, there is a problem that the first electroconductive polymer layer prevents the solution for forming the second electroconductive polymer layer inside small pores from permeating, and as a result, it restricts the formation of the electroconductive polymer layer inside small pores because the outer surface of the porous body is already covered with the first layer.

SUMMARY OF THE INVENTION

Accordingly, an object of the present invention is to provide a manufacturing method of a solid electrolytic capacitor using an electroconductive polymer as an electrolyte material which improves the capacitance appearance factor and equivalent series resistance in high frequency region.

The manufacturing method of a solid electrolytic capacitor is characterized by comprising the steps of: contacting a dielectric film of a porous body made of an oxide film of a electrochemical valve metal with an oxidant solution; and contacting the dielectric film with an electroconductive polymer forming monomer solution to form the electrolyte layer made of the electroconductive polymer on the surface of the dielectric film by an oxidative polymerization reaction, wherein an oxidative polymerization retarding agent which delays the oxidative polymerization reaction, is added to at least one of the solutions, an oxidant solution and a monomer solution.

The oxidative polymerization retarding agent is an additive to prevent the chemically-oxidative polymerization from occurring immediately when the oxidant and the monomer contact each other and to delay starting of the chemical oxidative polymerization reaction.

Pyrrole, pyrrole derivatives, thiophene, tiophene derivatives, or aniline is used as a monomer. Oxime compounds nitro compounds, nitroso compounds, nitroxide compounds, chinone compounds, or phenol compounds is used as an oxidative polymerization retarding agent.

Iron(II) sulfonate, sulfuric acid, or hydrogen peroxide is used as an oxidizing agent.

In the present invention, when an electrolyte layer made of an electroconductive polymer is formed by a chemical oxidative polymerization reaction, the starting time of the polymerization to form an electroconductive polymer layer is delayed by using an oxidative polymerization retarding agent. Because the polymerization started after the monomer and the oxidizing agent solution have permeated well into small pores, the electroconductive polymer layer is formed inside small pores and the capacitance appearance factor and the equivalent series resistance of a solid electrolytic capacitor with an electroconductive polymer as an electrolyte material are improved.

BRIEF DESCRIPTION OF THE DRAWINGS

In the accompanying drawings:

FIGS. 1A and 1B are sectional views of a small pore of the porous body element of a solid electrolytic capacitor to explain the formation of the electroconductive polymer layer in its pore by chemical oxidative polymerization after the formation of the dielectric in a conventional manufacturing method of a solid electrolytic capacitor with the electroconductive polymer electrolyte;

DETAILED DESCRIPTION OF THE PREFERRED EMBODIMENTS

The embodiments of the present invention are explained by referring to FIGS. 2 and 3A to 3C.

Figure 2:
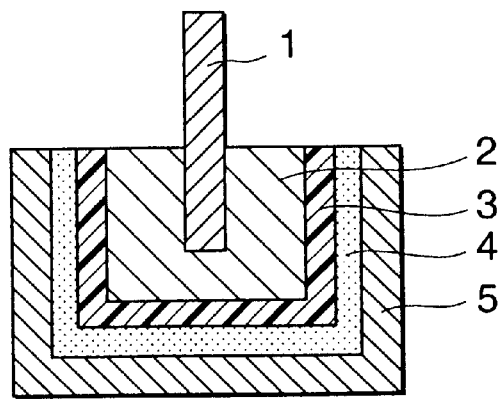
FIG. 2 is a cross-sectional view of a capacitor manufactured by the method described in the present invention.

A tantalum wire 1, which becomes the anode of a solid electrolytic capacitor, is buried into a tantalum metal powder which has a valve-action capability. The powder is pressformed and the wire and pressed powder are sintered to form a porous anode body 2. Then, the anode body 2 is anodized in an aqueous solution of phosphoric acid to form a dielectric film 3 of tantalum oxide ($Ta_2O_5$) on the surface of the anode body 2. Thus, a porous body element 6 is formed (FIGS. 2 and 3A).

Figures 3A, 3B, 3C:
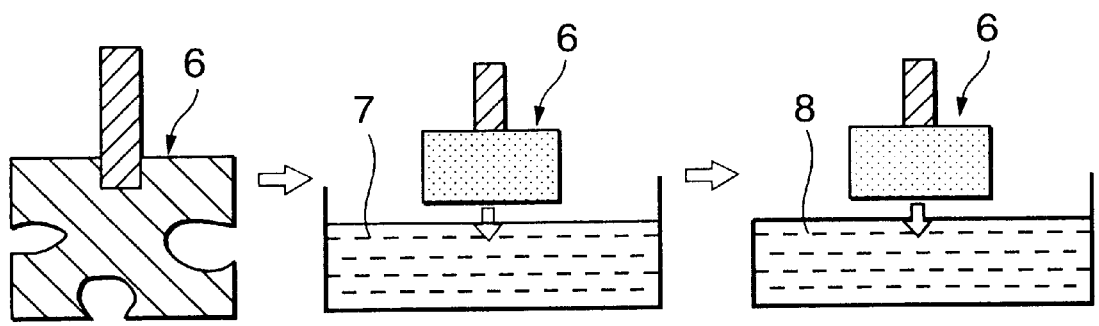
FIGS. 3A to 3C are cross-sectional drawings to explain steps of the manufacturing method of the solid electrolytic capacitor described in FIG. 2.

Next, the porous body element 6 with the dielectric film 3 is soaked in an oxidant solution 7 for a predetermined time (FIG. 3B). After it is dried, as shown in FIG. 3C, it is soaked in a monomer solution containing an oxidative polymerization retarding agent (a mixed solution 8 of a monomer and an oxidative polymerization retarding agent) for a predetermined time. Then, the porous body element 6 is pulled out of the oxidant solution 7 and dried in air.

The above steps shown in FIGS. 3B and 3C are repeated (3 to 10 times). With these steps, an electrolyte layer 4 made of an electroconductive polymer having a predetermined thickness is formed inside the pores and on the surface of the dielectric film 3 of the porous body element 6.

Iron(II) sulfonate (e.g., iron(II) p-toluene sulfonate, iron (II) dodecylbenzene sulfonate, iron(II) benzene sulfonate, and iron(II) naphthalene sulfonate), sulfuric acid, or hydrogen peroxide is used as a solution of the oxidant.

Pyrrole, pyrrole derivatives, thiophene, thiophene derivatives, or aniline is used as a monomer. Oxime compounds, nitro compounds, nitroso compounds, nitroxide compounds, chinone compounds, or phenol compounds is used as an oxidative polymerization retarding agent.

Oxime compounds (e.g., p-benzoquinone dioxime and diethyl ketone dioxime), nitro compounds (e.g., dinitrobenzene, nitrotoluene, 2,2-diphenyl-picryl-hydrazyl, and picric acid), nitroso compounds (e.g., n-nitroso phenylhydroxylamine ammonium salt, nitrosotoluene, and nitrosobenzene), nitroxide compounds (e.g., 2,2,6,6-tetramethyl-1-1piperidyloxy, 4,4-dimethyl-3-oxazolinyloxy, 2,2,5,5-tetramethyl-1-pyrrolidinyloxy, 5,5-dimethyl-1-pyrroline-n-oxide, 2,5,5-trimethyl-1-pyrroline, n-tert-butyl-α-phenylnitrone, α-(4-pyridyl-1-oxide)-n-tert-butylnitrone, 2-methyl-2-nitrosopropane, 2-hydroxymethyl-2-nitrosopropane, 2,4,6-tri-tert-butyl-nitrosobenzene, nitrosodurene, and pyridine-n-oxide), quinone compounds (e.g., benzoquinone, naphthoquinone, hydroquinone, methylhydroquinone, hydroquinone monomethyl ether, 2,5-diphenyl-p-benzoquinone, and mono-t-butyl-p-benzoquinone), or phenol compounds (e.g., catechol, pyrogallol, 2,6-di-t-butyl-4-methylphenol, phenol, resorcin, and naphthol) is used as an oxidative polymerization retarding agent.

The amount of the oxidative polymerization retarding agent added to the monomer solution is 0.1 to 20 wt %, preferably 1 to 20 wt %. The most preferred amount is 1 to 10 wt %. When the amount of the retarding agent added is less than 0.1 wt %, the covering rate of the electrolyte layer 4 inside small pores of the dielectric film 3 decreases remarkably. When the amount of the oxidative polymerization retarding agent is more than 20 wt %, it is difficult to form the electrolyte layer 4 not only inside the small pores but also on the outer surface because the oxidative polymerization reaction of the monomer is suppressed remarkably.

After forming the electrolyte layer 4 with the above steps, a cathode layer 5 is formed by forming a carbon paste and the silver paste successively on the surface of the electrolyte layer 4 and a capacitor element is completed. After an external lead terminal is connected with each of the tantalum wire 1 in the capacitor element and a silver paste in the cathode layer 5, by sealing the capacitor element with a sealing resin such as an epoxy resin, the intended capacitor is manufactured.

Although the oxidative polymerization retarding agent is mixed into a monomer solution in the above embodiment, it is possible to mix the retarding agent into the oxidant solution or to mix the retarding agent into both the monomer solution and the oxidant solution. In the case of adding the oxidative polymerization retarding agent into the oxidizing agent solution, the amount of the retarding agent is same as that into the monomer solution.

In the case of adding the oxidative polymerization retarding agent into both the monomer solution and the oxidant solution, the sum of the amount of the retarding agent added into the solutions is 0.1 to 20 wt %. The sum total amount is preferably 1 to 20 wt % and the most preferred amount is 1 to 10 wt %. When the sum total amount of the oxidative polymerization retarding agent is less than 0.1 wt %, the covering rate of the electrolyte layer 4 into small pores decreases remarkably. When the sum total amount of the retarding agent is more than 20 wt %, it is difficult to form the electrolyte layer 4 not only inside the small pores but also on the outer surface because the oxidative polymerization reaction of the monomer is suppressed remarkably.

The above-described Ta or another metal such as Al, Nb, or Ti is used as a metal powder having a valve-action.

Figure 4B:
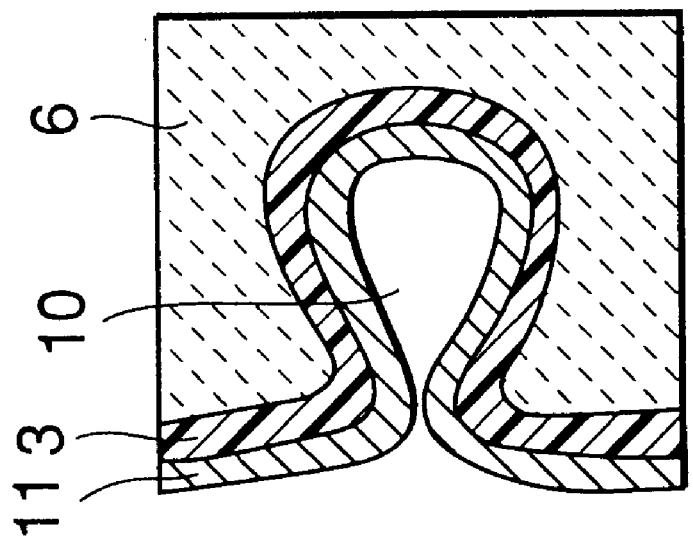
FIGS. 4A and 4B are sectional views of a small pore of the porous body element of a solid electrolytic capacitor to explain the action of the oxidative polymerization retarding agent in the chemical oxidative polymerization reaction step of the electroconductive polymer layer in the manufacturing method of a solid electrolytic capacitor in the present invention.
Figure 4A:
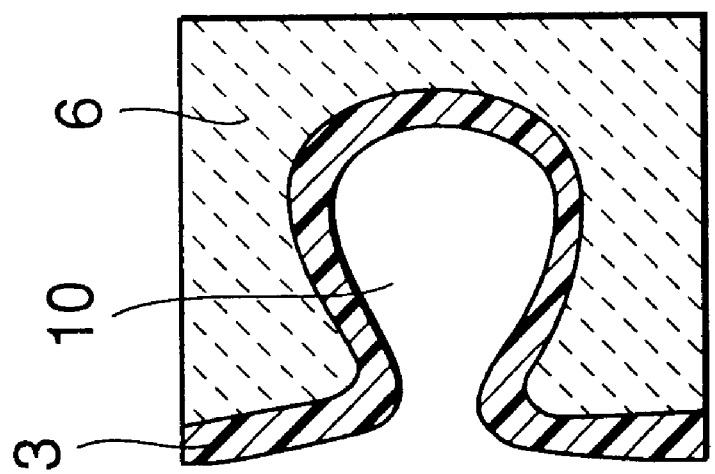

Next, the operations of the embodiment in the present invention are explained by referring to FIGS. 4A and 4B.

As described above by referring to FIG. 1, in the conventional technique, the porous body element 6 is soaked in an oxidant solution to adhere the oxidant inside the element pore 10, and then soaked in a monomer solution. At the moment the porous body element is soaked into the solution, chemical oxidative polymerization starts and an electroconductive polymer layer 11 as an electrolyte material is formed before the monomer permeates into the element pore 10. As a result, the entrance of the element pore 10 is clogged with the electroconductive polymer layer 11 and the permeation of the oxidant or the monomer into the pores is disturbed in the repeating process to form the electroconductive polymer layer as follows.

In the present invention, the oxidative polymerization retarding agent is mixed in at least one of the monomer solution and the oxidizing solution, when the monomer contacts with the oxidizing agent on the surface of the porous body element 6, the oxidative polymerization retarding agent contacts at the same time with the monomer and the oxidizing agent. By the action of the oxidative polymerization retarding agent, the chemical oxidative polymerization reaction doesn't start at the moment the porous body element 6 is soaked in the monomer solution. Accordingly, the monomer permeates into small pores of the element before the polymerization starts, and thus an electroconductive polymer layer is formed inside the element pore without causing the blockage with the electroconductive polymer layer at the entrance of the pore.

Preferred embodiments of the present invention are described below by referring to FIGS. 3A to 3C. However, the present invention is not limited to the embodiments.

EXAMPLE 1

A rectangular parallelepiped tantalum powder sintered pellet having 1 mm long, 1 mm wide, and 1 mm high is anodized in 0.1 wt % nitric acid solution at 33V to form a dielectric film on its surface and a porous body element 6 is obtained (FIG. 3A).

Then, the porous body element 6 with a dielectric film is soaked in an oxidizing agent solution 7, a methyl alcohol solution with 40 wt % iron(II) p-toluenesulfonate, for one minute (FIG. 3B). And, the element is pulled out of the oxidizing agent solution 7 and dried at room temperature.

Then, the element is soaked in a monomer/oxidative polymerization retarding agent mixture solution 8 obtained by adding 10 wt % p-benzoquinone as a retarding agent to a pyrrole solution, for one minute (FIG. 3C). Then, the porous body element 6 is pulled out of the monomer/oxidative polymerization retarding agent mixture solution 8 and kept in air for 30 min. By repeating this step three times, an electroconductive polymer layer of polypyrrole is formed on the surface of the porous body element 6. Then the porous body element 6 with an electroconductive polymer layer is cleaned with butyl alcohol for 30 min. It is possible to use isopropyl alcohol instead of the butyl alcohol for the cleaning.

Then, a carbon paste and a silver paste are sequentially formed on the surface of the electrolyte layer 4, dried to form a cathode layer 5, and a capacitor element is completed. After an external lead terminal is connected with each of a tantalum wire 1 and the silver paste of the cathode layer 5 in the capacitor element, by sealing the capacitor element with a sealing resin such as an epoxy resin, the intended capacitor is manufactured.

EXAMPLE 2

A capacitor is completed in the same manner as in Example 1, except that the pyrrole for forming an electroconductive polymer layer in Example 1 is replaced by thiophene.

After the porous body element 6 is formed (FIG. 3A), the porous body element 6 is soaked in an oxidizing agent solution 7, a methyl alcohol solution with 40 wt. % iron(II) p-toluenesulfonate, for one minute (FIG. 3B). Then, the element is pulled out of the oxidizing agent solution 7 and dried at room temperature.

Then, the element is soaked in a monomer/oxidative polymerization retarding agent mixture solution 8 obtained by adding 10 wt. % p-benzoquinone as a retarding agent to a thiophene solution, for one minute (FIG. 3C). Then, the porous body element 6 is pulled out of the monomer/ oxidative polymerization retarding agent mixture solution 8 and kept in air for 30 min. By repeating this step three times, an electroconductive polymer layer of polythiophene is formed on the surface of the porous body element 6. Then the porous body element 6 with an electroconductive polymer layer is cleaned with butyl alcohol for 30 min. It is possible to use isopropyl alcohol instead of the butyl alcohol for the cleaning.

EXAMPLE 3

A rectangular parallelepiped tantalum powder sintered pellet having 1 mm long, 1 mm wide, and 1 mm high is anodized in 0.1 wt. % nitric acid solution at 33V to form a dielectric film on its surface and a porous body element 6 is obtained (FIG. 3A).

Then, 5 wt. % p-benzoquinone as an oxidative polymerization retarding agent is added to an oxidant solution 7, a methyl alcohol solution with 40 wt % iron(II) p-toluenesulfonate. The porous body element 6 with a dielectric film is soaked in the solution for one minute (FIG. 3B). Then, the element is pulled out of the oxidant solution 7 and dried at room temperature.

Then, the element is soaked in a monomer/oxidative polymerization retarding agent mixture solution 8 obtained by adding 5 wt % p-benzoquinone as a retarding agent to a pyrrole solution, for one minute (FIG. 3C). Then, the porous body element 6 is pulled out of the monomer/oxidative polymerization retarding agent mixture solution 8 and kept in air for 30 min. By repeating this step three times, an electroconductive polymer layer of polypyrrole is formed on the surface of the porous body element 6. Then the porous body element 6 with an electroconductive polymer layer is cleaned with butyl alcohol for 30 min.

Then, a carbon paste and a silver paste are applied on the surface of the electrolyte layer 4 successively, dried to form a cathode layer 5, and a capacitor element is completed. After an external lead terminal is connected with each of a tantalum wire 1 and the silver paste of the cathode layer 5 in the capacitor element, by sealing the capacitor element with a sealing resin such as an epoxy resin, the intended capacitor is manufactured.

As described above, in the present invention, delaying the polymerization by adding an oxidative polymerization retarding agent to at least one of the solutions, the monomer solution and the oxidant solution, the following advantages are obtained:

(1) A covering rate of the electroconductive polymer layer on the surface of the inside and outside of the small pores improves because the clogging of the electroconductive polymer layer at the entrance of the small pore in the porous body is suppressed.

(2) The capacitance appearance factor increases while the equivalent series resistance decreases in the high-frequency region, and thus a solid electrolytic capacitor with improved characteristics can be manufactured.

In the above explanation of the present invention, an electrolyte layer of an electroconductive polymer is formed on the surface of a dielectric film formed by anodizing a porous body of a electrochemical valve metal. The explanation of the present invention can be applied to the manufacturing method of a solid electrolytic capacitor with an electrolyte layer of an electroconductive polymer on a dielectric film on a porous body formed by thermally decomposing an organic metal compound of a electrochemical valve metal.

What is claimed is:

1. A method of manufacturing a solid electrolytic capacitor comprising:

a first step of contacting a dielectric film of a porous valve metal with an oxidant solution; and a second step of contacting said dielectric film with a monomer solution to form an electrolyte layer of an electroconductive polymer and thereby forming an electrolyte layer of said electroconductive polymer on a surface of said dielectric film by an oxidative polymerization reaction, wherein at least one of said oxidant solution and said monomer solution contains an oxidative polymerization retarding agent to delay said oxidative polymerization reaction.

2. The method of a solid electrolytic capacitor according to claim 1, wherein said monomer is selected from the group consisting of pyrrole, a pyrrole derivative, thiophene, a thiophene derivative, and aniline.

3. The method of a solid electrolytic capacitor according to claim 1, wherein said oxidative polymerization retarding agent is selected from the group consisting of an oxime compound, a nitro compound, a nitroso compound, a nitroxide compound, a phenol compound, and a quinone compound.

4. The method of a solid electrolytic capacitor according to claim 1, wherein said oxidative polymerization retarding agent is added into said oxidant solution only, with concentration 0.1 to 20 wt %.

5. The method of a solid electrolytic capacitor according to claim 1, wherein said oxidative polymerization retarding agent is added into said monomer solution only, with concentration 0.1 to 20 wt %.

6. The method of a solid electrolytic capacitor according to claim 1, wherein said oxidative polymerization retarding agent is added into both said oxidant solution and said monomer solution, and its total concentration is 0.1 to 20 wt %.

7. The method of a solid electrolytic capacitor according to claim 1, wherein said oxidant is selected from the group consisting of iron (II) sulfonate, sulfuric acid, and hydrogen peroxide.

8. The method of a solid electrolytic capacitor according to claim 1, wherein said electrochemical valve metal is selected from the group consisting of Ta, Al, Nb, and Ti.

9. The method of a solid electrolytic capacitor according to claim 1, wherein said oxidant solution includes methyl alcohol.

10. The method of a solid electrolytic capacitor according to claim 1, wherein said first step and said second step are repeated equal to or more than three times.

11. The method of a solid electrolytic capacitor according to claim 1, further comprising the step of cleaning the surface of said dielectric film having said electroconductive polymer layer with an alcohol selected from butyl alcohol and isopropyl alcohol after said second step.

12. The method of a solid electrolytic capacitor according to claim 1, further comprising the step of forming a cathode layer on the surface of said electroconductive polymer layer after said second step.

13. A method of manufacturing a solid electrolytic capacitor comprising:

a first step of contacting a dielectric film of a porous valve metal with an oxidant solution; and a second step of contacting said dielectric film with a monomer solution to form an electrolyte layer of a electroconductive polymer and thereby forming an electrolyte layer of said electroconductive polymer on a surface of said dielectric film by an oxidative polymerization reactions, wherein at least one of said oxidant solution and said monomer solution contains an oxidative polymerization retarding agent with concentration 0.1 to 20 wt % to delay said oxidative polymerization reaction.

14. A method of manufacturing a solid electrolytic capacitor comprising:

a first step of contacting a dielectric film of a porous valve metal with an oxidant solution; and a second step of contacting said dielectric film with a monomer solution to form an electrolyte layer of a electroconductive polymer and thereby forming an electrolyte layer of said electroconductive polymer on a surface of said dielectric film by an oxidative polymerization reactions, wherein at least one of said oxidant solution and said monomer solution contains an oxidative polymerization retarding agent with concentration 0.1 to 20 wt % to delay said oxidative polymerization reaction, and said oxidative polymerization retarding agent is selected from the group consisting of an oxime compound, a nitro compound, a nitroso compound, a nitroxide compound, a phenol compound, and a quinone compound.

* * * * *

UNITED STATES PATENT AND TRADEMARK OFFICE
CERTIFICATE OF CORRECTION

PATENT NO. : 6,421,228 B2
DATED : July 16, 2002
INVENTOR(S) : Kenji Araki

It is certified that error appears in the above-identified patent and that said Letters Patent is hereby corrected as shown below:

<u>Title page,</u>
After item "[22] Filed: May 4, 2001" insert
-- [30] Foreign Applications Priority Data
     May 11, 2000      J P......................... 2000-138617 --

Signed and Sealed this

Twenty-eighth Day of October, 2003

JAMES E. ROGAN
*Director of the United States Patent and Trademark Office*